(12) United States Patent
Iwakawa et al.

(10) Patent No.: US 12,222,301 B2
(45) Date of Patent: Feb. 11, 2025

(54) X-RAY INSPECTION APPARATUS

(71) Applicant: ISHIDA CO., LTD., Kyoto (JP)

(72) Inventors: Ken Iwakawa, Ritto (JP); Akihiro Maenaka, Ritto (JP); Futoshi Yurugi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 206 days.

(21) Appl. No.: 18/160,139

(22) Filed: Jan. 26, 2023

(65) Prior Publication Data
US 2023/0258581 A1 Aug. 17, 2023

(30) Foreign Application Priority Data
Feb. 2, 2022 (JP) .................................. 2022-015119

(51) Int. Cl.
*G01N 23/04* (2018.01)
*G01N 23/083* (2018.01)
*G01N 23/18* (2018.01)

(52) U.S. Cl.
CPC ........... *G01N 23/04* (2013.01); *G01N 23/083* (2013.01); *G01N 23/18* (2013.01); *G01N 2223/04* (2013.01); *G01N 2223/50* (2013.01); *G01N 2223/646* (2013.01); *G01N 2223/652* (2013.01)

(58) Field of Classification Search
CPC ...... G01N 23/04; G01N 23/083; G01N 23/18; G01N 2223/04; G01N 2223/50; G01N 2223/646; G01N 2223/652; G01N 2223/424
See application file for complete search history.

(56) References Cited

U.S. PATENT DOCUMENTS

| | | | | |
|---|---|---|---|---|
| 2013/0216024 A1* | 8/2013 | Matoba | ................. | G01N 23/04 378/62 |
| 2018/0188191 A1* | 7/2018 | Davis, III | ............ | G01N 23/087 |
| 2021/0004994 A1* | 1/2021 | Kubo | ..................... | G01N 23/04 |
| 2023/0243764 A1* | 8/2023 | Iwakawa | ................ | G01N 23/18 378/58 |

(Continued)

FOREIGN PATENT DOCUMENTS

| | | |
|---|---|---|
| EP | 3805742 A1 | 4/2021 |
| JP | 2012-073056 A | 4/2012 |

(Continued)

OTHER PUBLICATIONS

Extended Search Report in the corresponding European Patent Application No. 23153864.6 dated May 26, 2023.

*Primary Examiner* — David P Porta
*Assistant Examiner* — Gisselle M Gutierrez
(74) *Attorney, Agent, or Firm* — Global IP Counselors, LLP (57) ABSTRACT

An X-ray inspection apparatus includes an X-ray source configured to irradiate an article with X-rays in a plurality of energy bands, an X-ray detection unit capable of detecting the X-rays by a photon counting method, an image generation unit configured to generate an overall transmission image corresponding to the X-rays in all of the plurality of energy bands and a transmission image corresponding to the X-rays in some of the plurality of energy bands on the basis of a detection result of the X-rays by the X-ray detection unit, and an inspection unit configured to inspect the article on the basis of the overall transmission image and the transmission image.

9 Claims, 5 Drawing Sheets

(56) References Cited

U.S. PATENT DOCUMENTS

| | | | | |
|---|---|---|---|---|
| 2023/0252620 A1* | 8/2023 | Tsunoda | ............... | G01N 23/083 |
| | | | | 702/81 |
| 2023/0252621 A1* | 8/2023 | Tsunoda | ................ | G01N 23/04 |
| | | | | 382/110 |

FOREIGN PATENT DOCUMENTS

| JP | 5297142 B2 | | 9/2013 |
|---|---|---|---|
| JP | 6663374 B2 | * | 3/2020 |
| JP | 2021-148486 | * | 9/2021 |

* cited by examiner

X-RAY INSPECTION APPARATUS

TECHNICAL FIELD

The present disclosure relates to an X-ray inspection apparatus.

BACKGROUND

For example, an apparatus described in Japanese Unexamined Patent Publication No. 2012-73056 is known as an X-ray inspection apparatus according to the related art. The X-ray inspection apparatus described in Japanese Unexamined Patent Publication No. 2012-73056 includes an X-ray source that irradiates an object to be inspected with X-rays, a sensor unit including a first sensor that detects X-rays in a first energy band and a second sensor that detects X-rays in a second energy band emitted from the X-ray source, an image generation unit that generates a first transmission image of the object to be inspected on the basis of X-ray data detected by the first sensor and a second transmission image of the object to be inspected on the basis of X-ray data detected by the second sensor, and an inspection unit that performs inspection on the basis of the images generated by the image generation unit. The X-ray inspection apparatus can extract only a foreign material by erasing the object to be inspected from the first transmission image and the second transmission image.

SUMMARY

The X-ray inspection apparatus can extract only the foreign material as described above. Therefore, even when the object (article) to be inspected is thick, it is possible to inspect whether a foreign material is present or absent in the object to be inspected with high accuracy. On the other hand, for example, when the object to be inspected includes a thin portion (for example, a portion of packaging material or the like), there is a concern that the presence or absence of a foreign material in the portion will not be inspected with high accuracy.

An object of an aspect of the present disclosure is to provide an X-ray inspection apparatus that can inspect articles having various thicknesses with high accuracy.

According to an aspect of the present disclosure, there is provided an X-ray inspection apparatus including: an X-ray source configured to irradiate an article with X-rays in a plurality of energy bands; an X-ray detection unit capable of detecting the X-rays by a photon counting method; an image generation unit configured to generate an overall transmission image corresponding to the X-rays in all of the plurality of energy bands and a transmission image corresponding to the X-rays in some of the plurality of energy bands on the basis of a detection result of the X-rays by the X-ray detection unit; and an inspection unit configured to inspect the article on the basis of each of the overall transmission image and the transmission image.

According to this X-ray inspection apparatus, the inspection unit inspects the article on the basis of the overall transmission image and the transmission image. Here, the energy band for generating the transmission image is changed according to inspection conditions, it is possible to inspect, for example, whether a foreign material is present or absent in the article with high accuracy. In addition, the use of the overall transmission image makes it possible to inspect, for example, whether a foreign material is present or absent in the articles having various thicknesses. Therefore, the use of the X-ray inspection apparatus makes it possible to inspect the articles having various thicknesses with high accuracy.

According to another aspect of the present disclosure, there is provided an X-ray inspection apparatus including: an X-ray source configured to irradiate an article with X-rays in a plurality of energy bands; an X-ray detection unit capable of detecting the X-rays by a photon counting method; an image generation unit configured to generate (1) an overall transmission image corresponding to the X-rays in all of the plurality of energy bands, (2) a first transmission image corresponding to the X-rays in a first energy band included in the plurality of energy bands, (3) a second transmission image corresponding to the X-rays in a second energy band which is included in the plurality of energy bands and is lower than the first energy band, and (4) a difference image obtained by a subtraction process between the first transmission image and the second transmission image on the basis of a detection result of the X-rays by the X-ray detection unit; and an inspection unit configured to inspect the article on the basis of each of the difference image and at least one of the overall transmission image, the first transmission image, and the second transmission image.

According to this X-ray inspection apparatus, the inspection unit inspects the article on the basis of the difference image and at least one of the overall transmission image, the first transmission image, and the second transmission image. In this case, the use of the difference image makes it possible to inspect, for example, whether a foreign material is present or absent in a relatively thick portion of the article with high accuracy. In addition, the use of at least one of the overall transmission image, the first transmission image, and the second transmission image makes it possible to inspect, for example, whether a foreign material is present or absent in a portion different from the relatively thick portion in the article with high accuracy. Therefore, the use of the X-ray inspection apparatus makes it possible to inspect the articles having various thicknesses with high accuracy.

The inspection unit may inspect the article on the basis of the difference image and at least the overall transmission image. In this case, the use of the overall transmission image makes it possible to easily inspect, for example, whether a foreign material is present or absent in the articles having various thicknesses.

The inspection unit may inspect the article on the basis of the difference image and at least the first transmission image. In this case, the use of the first transmission image makes it possible to inspect, for example, whether a foreign material is present or absent particularly in a thin portion of the article with high accuracy.

The inspection unit may inspect the article on the basis of the difference image and at least the second transmission image. In this case, the use of the second transmission image makes it possible to inspect, for example, whether a foreign material is present or absent in a relatively thick portion of the article with high accuracy.

The image generation unit may generate the first transmission image on the basis of the overall transmission image and the second transmission image.

The X-ray inspection apparatus may further include a display unit configured to receive an operation from an outside. The display unit may receive an operation of selecting an image used to inspect the article by the inspection unit. In this case, it is possible to appropriately change, for example, the accuracy of inspection through the display unit.

The X-ray detection unit may be a direct-conversion-type detection unit. In this case, it is possible to reduce the size of the X-ray inspection apparatus.

According to an aspect of the present disclosure, it is possible to provide an X-ray inspection apparatus that can inspect articles having various thicknesses with high accuracy.

DETAILED DESCRIPTION

Hereinafter, a preferred embodiment of the present disclosure will be described in detail with reference to the accompanying drawings. In addition, in the description of the drawings, the same or corresponding elements are denoted by the same reference numerals, and the redundant description thereof will be omitted.

Figure 1:
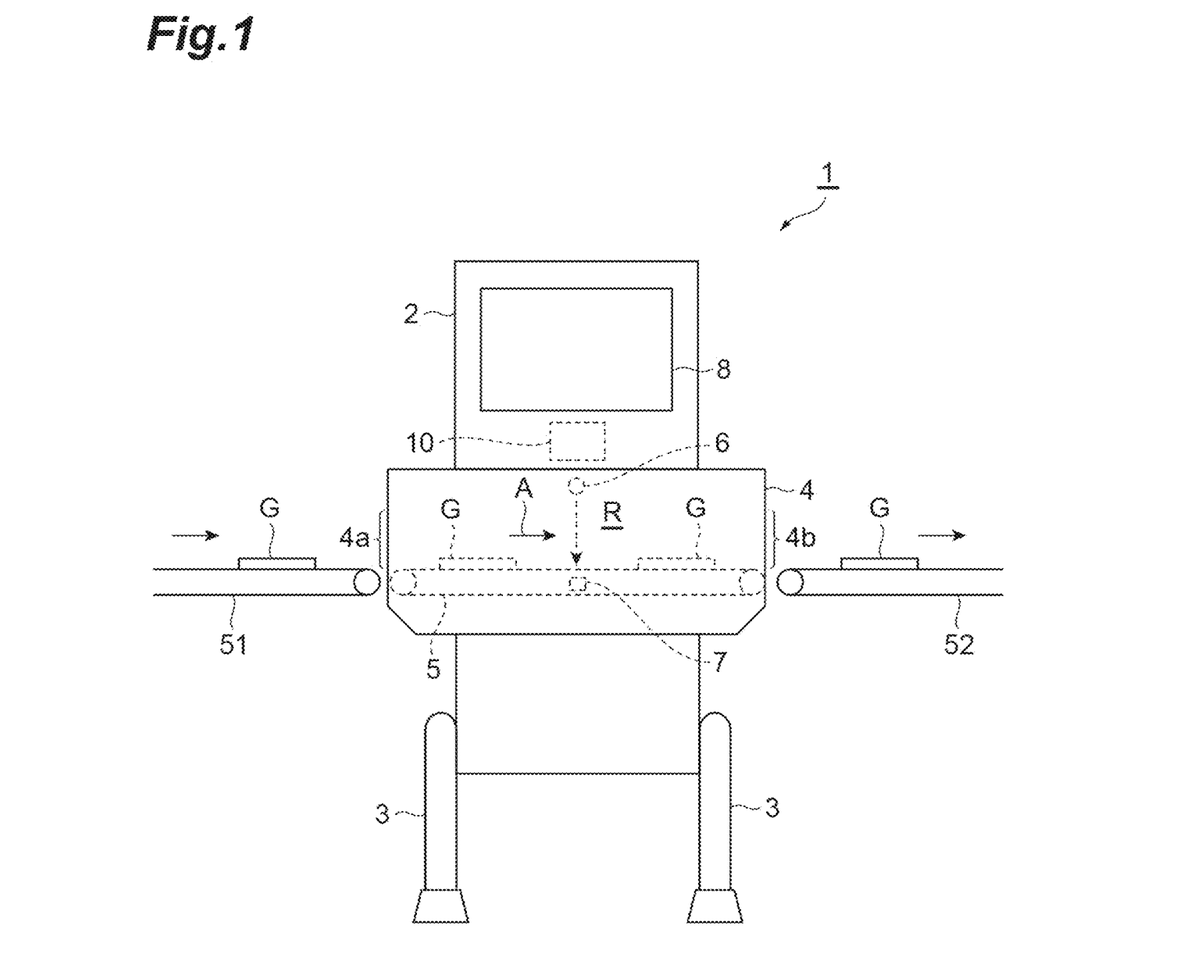
FIG. 1 is a diagram showing a configuration of an X-ray inspection apparatus according to an embodiment.

As shown in FIG. 1, an X-ray inspection apparatus 1 includes an apparatus main body 2, support legs 3, a shield box 4, a transport unit 5, an X-ray irradiation unit 6, an X-ray detection unit 7, a display operation unit 8, and a control unit 10. The X-ray inspection apparatus 1 generates an X-ray transmission image of an article G while transporting the article G and performs an inspection (for example, an inspection of the number of stored items, an inspection of foreign materials, an inspection of missing items, an inspection of cracks and chips, or the like) on the article G on the basis of the X-ray transmission image. The article G before inspection is carried into the X-ray inspection apparatus 1 by a carry-in conveyor 51. The article G after inspection is carried out from the X-ray inspection apparatus 1 by a carry-out conveyor 52. The article G determined to be defective by the X-ray inspection apparatus 1 is sorted out of a production line by a sorting device (not shown) that is disposed on a downstream side of the carry-out conveyor 52. The article G determined to be non-defective by the X-ray inspection apparatus 1 passes through the sorting device as it is. In this embodiment, the article G is a cereal flake.

The apparatus main body 2 accommodates the control unit 10 and the like. The support legs 3 support the apparatus main body 2. The shield box 4 is provided in the apparatus main body 2. The shield box 4 prevents the leakage of X-rays (electromagnetic waves) to the outside. An inspection region R in which the article G is inspected by X-rays is provided in the shield box 4. A carry-in port 4a and a carry-out port 4b are formed in the shield box 4. The article G before inspection is carried from the carry-in conveyor 51 into the inspection region R through the carry-in port 4a. The article G after inspection is carried out from the inspection region R to the carry-out conveyor 52 through the carry-out port 4b. An X-ray shielding curtain (not shown) that prevents the leakage of X-rays is provided in each of the carry-in port 4a and the carry-out port 4b.

The transport unit 5 is a member that transports the article G and is disposed so as to pass through the center of the shield box 4. The transport unit 5 transports the article G along a transport direction A from the carry-in port 4a to the carry-out port 4b through the inspection region R. The transport unit 5 is, for example, a belt conveyor that extends between the carry-in port 4a and the carry-out port 4b. In addition, the transport unit 5, which is a belt conveyor, may protrude from the carry-in port 4a and the carry-out port 4b to the outside.

Figure 2:
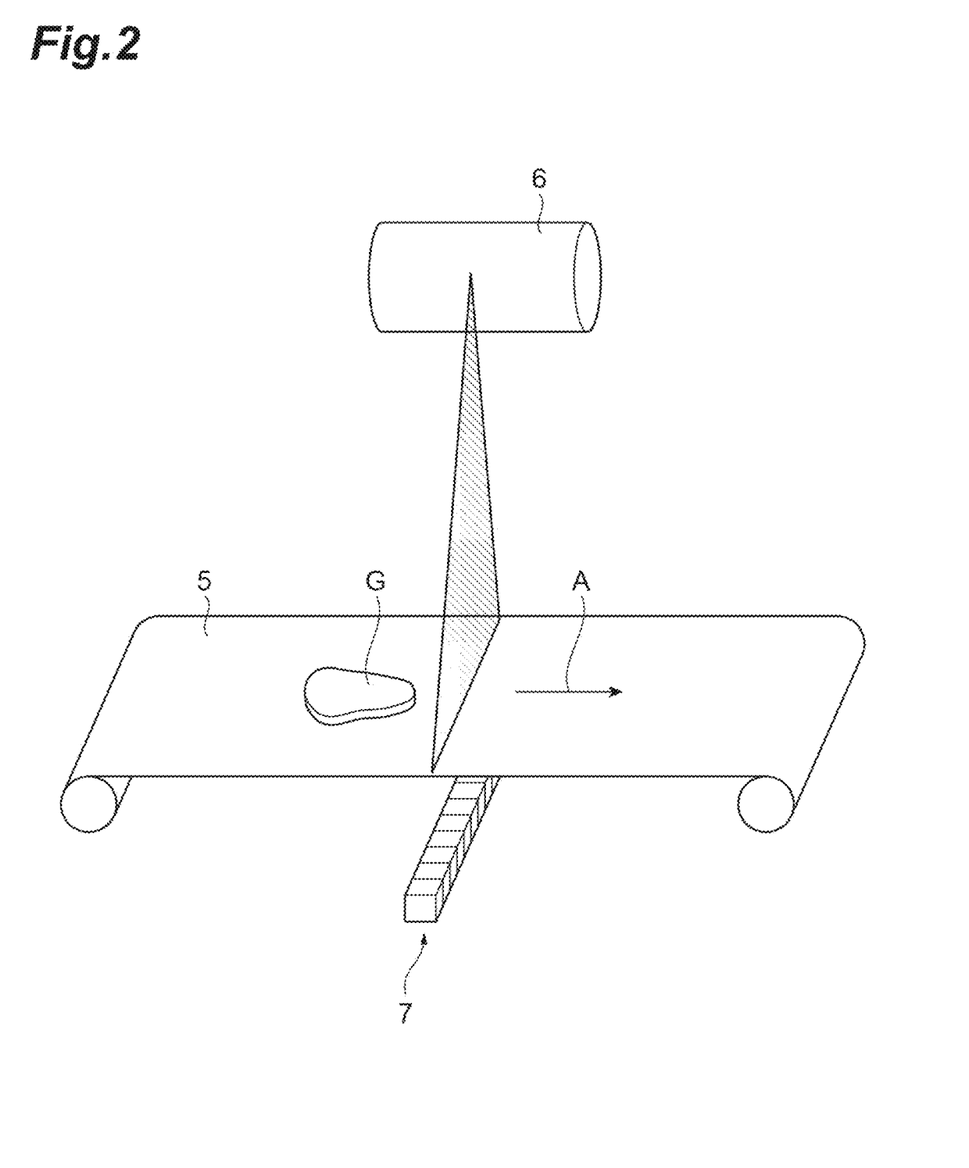
FIG. 2 is a diagram showing an internal configuration of a shield box shown in FIG. 1.

As shown in FIGS. 1 and 2, the X-ray irradiation unit 6 is an electromagnetic wave irradiation unit (X-ray source) that is disposed in the shield box 4. The X-ray irradiation unit 6 has, for example, an X-ray tube that emits X-rays and a collimator unit that spreads the X-rays emitted from the X-ray tube in a fan shape in a plane perpendicular to the transport direction A. The X-rays emitted from the X-ray irradiation unit 6 include X-rays in various energy bands from low energy (long wavelength) to high energy (short wavelength). Therefore, the X-ray irradiation unit 6 irradiates the article G transported by the transport unit 5 with X-rays in a plurality of energy bands. In addition, "low" and "high" in the low energy and the high energy described above indicate relatively "low" and "high" among a plurality of energy bands of X-rays emitted from the X-ray irradiation unit 6 and do not indicate a specific range. In this embodiment, the X-ray irradiation unit 6 emits X-rays in a plurality of energy bands including at least X-rays (first electromagnetic waves) in a first energy band and X-rays (second electromagnetic waves) in a second energy band which is lower than the first energy band. The first energy band and the second energy band may be separated by a predetermined threshold value or by different threshold values (for example, a first threshold value and a second threshold value different from the first threshold value). In the latter case, one or more energy bands may be present between the first energy band and the second energy band. In addition, the threshold values and the number of threshold values can be appropriately changed through the display operation unit 8 in accordance with, for example, a change in the type of article G and a change in inspection conditions.

The X-ray detection unit 7 is a sensor member that detects electromagnetic waves. The X-ray detection unit 7 is disposed in the shield box 4 at a position facing the X-ray irradiation unit 6 in the vertical direction. The X-ray detection unit 7 may be capable of detecting X-rays in a specific energy band or may be capable of detecting X-rays by a photon counting method. The X-ray detection unit 7 may be a direct-conversion-type detection unit or an indirect-conversion-type detection unit. In this embodiment, the X-ray detection unit 7 is a direct-conversion-type detection unit that can detect X-rays by the photon counting method and includes, for example, sensors (multi-energy sensors) that detect X-rays in each of a plurality of energy bands transmitted through the article G. The sensors are arranged, for example, in a direction (width direction) orthogonal to at least the transport direction of the transport unit 5 and the vertical direction. The sensors may be arranged not only in the width direction but also in the transport direction. That is, the X-ray detection unit 7 may include a line sensor or may include a group of sensors that are arranged two-dimensionally. The sensors are, for example, photon-detection-type sensors such as CdTe semiconductor detectors.

In the element included in the X-ray detection unit 7, for example, electron-hole pairs are generated by the arrival of X-ray photons. Photon counting is performed on the basis of the energy obtained at this time. Here, photon counting in each energy region can be performed using a predetermined threshold value (one or more threshold values). The X-ray detection unit 7 outputs a signal (detection result signal) corresponding to the detection results of the X-rays to the control unit 10.

As shown in FIG. 1, the display operation unit 8 is a member (display unit) that is provided in the apparatus main body 2. The display operation unit 8 displays various types of information and receives an input operation for various conditions from the outside. The display operation unit 8 is, for example, a liquid crystal display and displays an operation screen as a touch panel. In this case, an operator can input various conditions through the display operation unit 8. For example, an operation of selecting an image (which will be described in detail below) used by the inspection unit 23 (see FIG. 3) included in the control unit 10 to inspect the article G is received as the input operation. This makes it possible to suitably acquire a desired inspection result.

The control unit 10 is disposed in the apparatus main body 2. The control unit 10 controls the operation of each unit (in this embodiment, the transport unit 5, the X-ray irradiation unit 6, the X-ray detection unit 7, the display operation unit 8, and the sorting device (not shown) disposed on the downstream side of the X-ray inspection apparatus 1) of the X-ray inspection apparatus 1. In addition, the sorting device is a device that excludes, from a transport path, the object to be inspected (article) which has been determined to be defective in image inspection by the X-ray inspection apparatus 1. The control unit 10 includes a processor, such as a central processing unit (CPU), memories, such as a read only memory (ROM) and a random access memory (RAM), and a storage, such as a solid state drive (SSD). A program for controlling the X-ray inspection apparatus 1 is recorded on the ROM.

Figure 3:
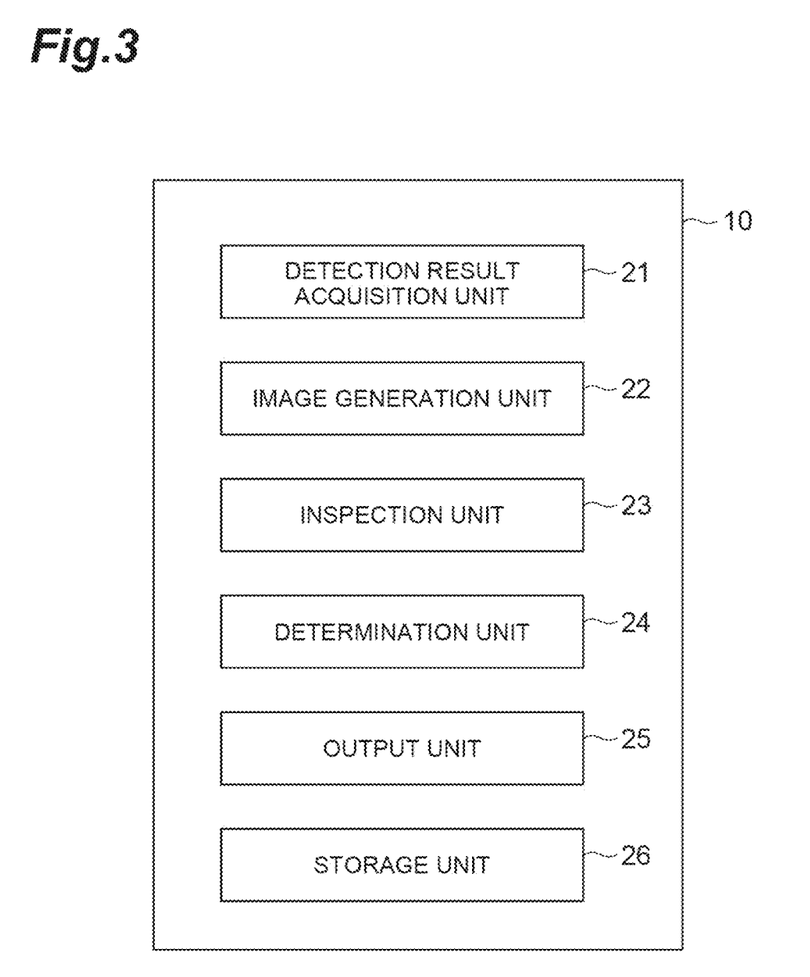
FIG. 3 is a diagram showing a functional configuration of a control unit.

FIG. 3 is a diagram showing a functional configuration of the control unit. As shown in FIG. 3, the control unit 10 includes a detection result acquisition unit 21, an image generation unit 22, an inspection unit 23, a determination unit 24, an output unit 25, and a storage unit 26.

The detection result acquisition unit 21 acquires the detection result signal output from the X-ray detection unit 7. The detection result acquisition unit 21 transmits the acquired detection result signal to the image generation unit 22.

The image generation unit 22 is mainly configured by, for example, a graphics processing unit (GPU) and develops the detection result signal in a two-dimensional image on a memory. The memory in which the two-dimensional image is developed is, for example, a memory included in the GPU, but is not limited thereto. The image generation unit 22 generates a plurality of images used to inspect the article G on the basis of the detection result of the X-rays by the X-ray detection unit 7. For example, the image generation unit 22 generates, as one of the plurality of images, an overall transmission image (non-energy analysis image) corresponding to the X-rays in all of the plurality of energy bands on the basis of the detection result. The overall transmission image is generated on the basis of, for example, all of information included in the detection result signal. When the overall transmission image is generated, information that is regarded as noise may be excluded in advance. In this case, the overall transmission image is generated on the basis of a portion of the information included in the detection result signal.

The image generation unit 22 generates one or more transmission images corresponding to the X-rays in some of the plurality of energy bands, in addition to the overall transmission image. In this embodiment, the image generation unit 22 generates, as the transmission images, a first transmission image P1 (see FIG. 4A) corresponding to the X-rays in the first energy band, a second transmission image P2 (see FIG. 4B) corresponding to the X-rays in the second energy band, and a difference image P3 (see FIG. 5) obtained by a subtraction process between the first transmission image P1 and the second transmission image P2.

The first transmission image P1 is generated on the basis of, for example, a portion of the information included in the detection result signal. The second transmission image P2 is generated on the basis of, for example, another portion of the information included in the detection result signal. The image generation unit 22 may generate the first transmission image P1 on the basis of the overall transmission image and the second transmission image P2. In this case, the first transmission image P1 is generated on the basis of, for example, difference data between data used for generating the overall transmission image and data used for generating the second transmission image P2. Alternatively, the image generation unit 22 may generate the second transmission image P2 on the basis of the overall transmission image and the first transmission image P1. In this case, the second transmission image P2 is generated on the basis of, for example, difference data between the data used for generating the overall transmission image and data used for generating the first transmission image P1. The article G and the background other than the article G are included in each of the first transmission image P1 and the second transmission image P2. As in the example shown in FIG. 4A, the first transmission image P1 is overall brighter than the second transmission image P2. On the other hand, as in the example shown in FIG. 4B, the second transmission image P2 is overall darker than the first transmission image P1. In this embodiment, the comparison between the brightness of the first transmission image P1 and the brightness of the second transmission image P2 corresponds to the comparison between the brightness of the article G displayed in the first transmission image P1 and the brightness of the article G displayed in the second transmission image P2.

Figure 5:
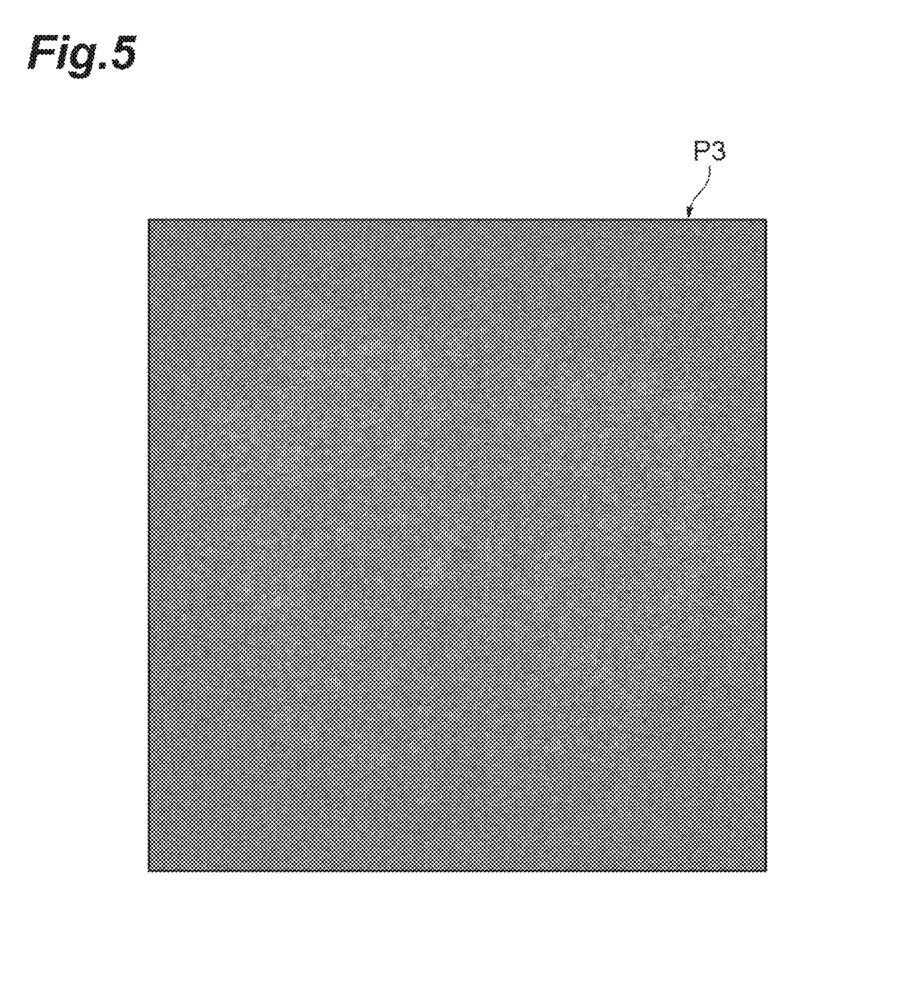
FIG. 5 is a diagram showing a difference image.

The difference image P3 is, for example, an image (energy analysis image) generated by performing image processing on at least one of the first transmission image P1 and the second transmission image P2 using an image processing algorithm. The image processing algorithm is a type indicating a processing procedure of the image processing performed on at least one of the first transmission image P1 and the second transmission image P2. The image processing algorithm is configured by one image processing filter or a combination of a plurality of image processing filters. A plurality of image processing algorithms can be acquired from the outside through a network such as the Internet. In addition, the plurality of image processing algorithms can also be acquired from an external storage medium such as a USB memory or a removable hard disk. At least one or more of the plurality of image processing algorithms can be automatically generated from a plurality of image processing filters on the basis of, for example, the specifications or inspection conditions of the X-ray inspection apparatus 1, adopting a genetic algorithm (GA) which is a method applying the mechanism of heredity and evolution in the living world. In addition, the operator can appropriately set at least some of the plurality of image processing algorithms through the display operation unit 8. An image processing algorithm used for the first transmission image P1 and an image processing algorithm used for the second transmission image P2 may be different from each other. For example, a process of changing brightness may be performed on one of the first transmission image P1 and the second transmission image P2 in order to match the brightness of the first transmission image P1 with the brightness of the second transmission image P2. Japanese Patent Application No. 2021-195926 incorporated herein by reference, describe a process using a luminance distribution as the above-mentioned process, for example.

The image generation unit 22 may use a program that is automatically set by machine learning, instead of using the image processing algorithm. This program is a prediction model (trained model) generated by machine learning and an inference program into which parameters (trained parameters) obtained as a result of machine learning have been incorporated. Examples of the machine learning used for the trained model include a neural network, a support vector machine, and a genetic algorithm. The trained model may include a convolutional neural network or may include a neural network with a plurality of layers (for example, eight or more layers). That is, the trained model corresponding to the above-described program may be generated by deep learning.

The inspection unit 23 inspects the article G on the basis of at least some of the plurality of images generated by the image generation unit 22. The inspection unit 23 inspects the article G on the basis of for example, each of the overall transmission image and the transmission images. Alternatively, the inspection unit 23 inspects the article G on the basis of, for example, each of at least one of the overall transmission image, the first transmission image P1, and the second transmission image P2 and the difference image P3. In other words, the inspection unit 23 inspects the article G on the basis of two or more of the plurality of images generated by the image generation unit 22. For example, the overall transmission image ray be used from the viewpoint of using a high-resolution image. For example, the first transmission image P1 may be used from the viewpoint of increasing the accuracy of inspection on a thin portion of the article G. For example, at least one of the second transmission image P2 and the difference image P3 may be used from the viewpoint of increasing the accuracy of inspection on a relatively thick portion of the article G.

In this embodiment, the inspection unit 23 inspects the article G using at least the difference image P3. When at least the difference image P3 is used, the inspection unit 23 may inspect the article G on the basis of the difference image P3 and the overall transmission image, may inspect the article G on the basis of the difference image P3 and the first transmission image P1, or may inspect the article G on the basis of the difference image P3 and the second transmission image P2. The inspection unit 23 may perform the inspection of the article G based on the difference image P3 and the inspection of the article G based on the other images at the same time or at different times. For example, while the image generation unit 22 is generating the difference image P3, the article G may be inspected on the basis of the overall transmission image and the like.

For example, the inspection unit 23 inspects whether a foreign material is present or absent in the article G, whether a crack and a chip are present or absent in the article G, and the like. However, the present disclosure is not limited thereto. For example, when the article G is wrapped in a sheet-like packaging material, the inspection unit 23 can also inspect the tearing of the packaging material, the defective sealing of the packaging material (seal bite), and the like. For example, when the article G is housed in a package, the inspection unit 23 can perform a foreign material confirmation inspection, a missing item confirmation inspection, a number-of-stored-items confirmation inspection, a void confirmation inspection, and the like on the package. The inspection unit 23 transmits the inspection result of the article G to the determination unit 24 and the storage unit 26.

The determination unit 24 determines whether or not the article G is a non-defective article on the basis of the inspection result received from the inspection unit 23. For example, the determination unit 24 determines whether a foreign material is present or absent in the article G, whether a crack and a chip are present or absent in the article G, and the like. The determination unit 24 transmits the determination result to the output unit 25 and the storage unit 26.

The output unit 25 outputs the determination result of the determination unit 24 to at least one of a portion other than the control unit 10 in the X-ray inspection apparatus 1 and an apparatus different from the X-ray inspection apparatus 1. Then, at least one of the X-ray inspection apparatus 1 and the apparatus (for example, the sorting device disposed on the downstream side of the X-ray inspection apparatus 1) different from the X-ray inspection apparatus 1 can perform an operation when the article G is defective. Other examples of the apparatus different from the X-ray inspection apparatus 1 include the carry-in conveyor 51, the carry-out conveyor 52, and a notification device.

The storage unit 26 records signals, data, and the like generated by the control unit 10. For example, the storage unit 26 records the detection result signal transmitted from the detection result acquisition unit 21, data of the image transmitted from the image generation unit 22, data related to the inspection result transmitted from the inspection unit 23, and data related to the determination result transmitted from the determination unit 24.

Figure 4A:
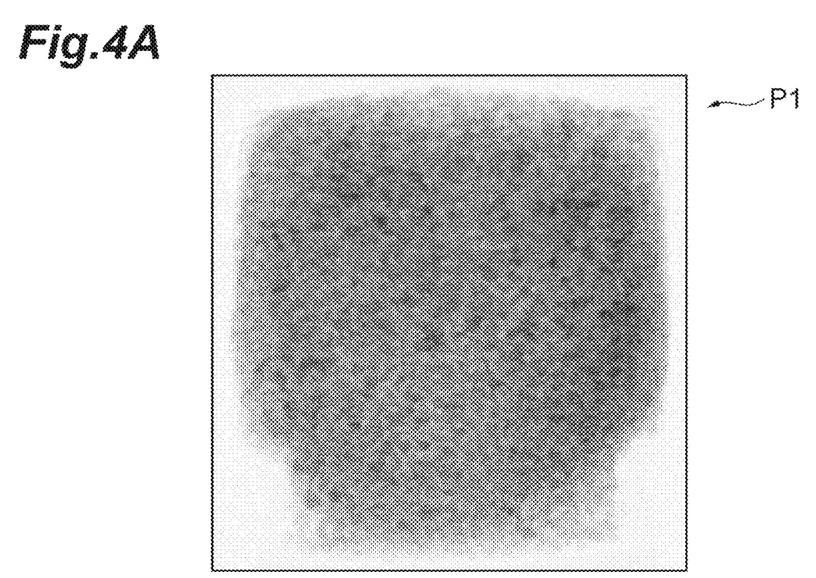
FIG. 4A is a diagram showing a first transmission image.
Figure 4B:
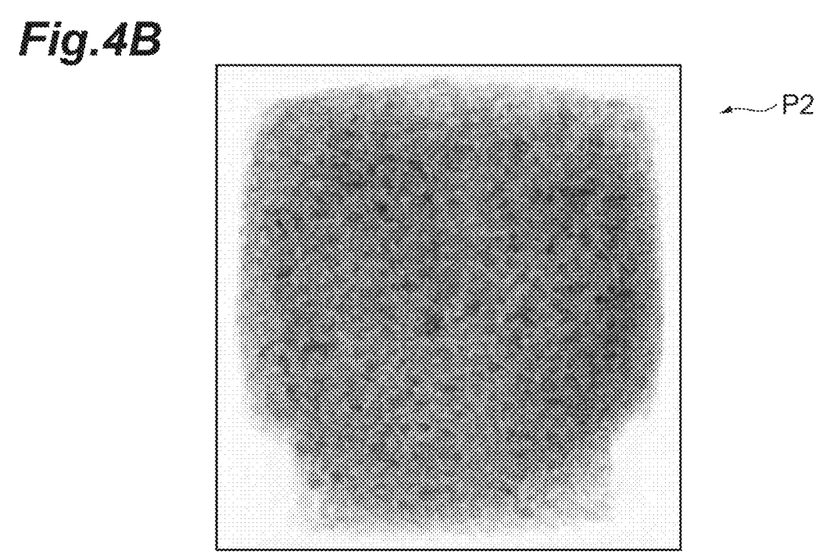
FIG. 4B is a diagram showing a second transmission image.

According to the X-ray inspection apparatus 1 of the above-described embodiment, the inspection unit 23 inspects the article G on the basis of each of at least one of the overall transmission image, the first transmission image P1, and the second transmission image P2 and the difference image P3. In this case, the use of the difference image P3 makes it possible to inspect, for example, whether a foreign material is present or absent in a relatively thick portion of the article G with high accuracy. In addition, the use of at least one of the overall transmission image, the first transmission image P1, and the second transmission image P2 makes it possible to inspect, for example, whether a foreign material is present or absent in a portion different from the relatively thick portion in the article G. Therefore, the use of the X-ray inspection apparatus 1 makes it possible to inspect the articles having various thicknesses with high accuracy.

In addition, according to this embodiment, one X-ray inspection apparatus can perform both a non-energy analysis process (an analysis process using at least one of the overall transmission image, the first transmission image P1, and the second transmission image P2) and an energy analysis process (an analysis process using the difference image P3). Therefore, for example, the use of the X-ray inspection apparatus 1 in the production line and the like makes it possible to achieve space saving, cost saving, energy saving, and the like while improving the accuracy of inspecting the article G.

In this embodiment, the inspection unit 23 may inspect the article G on the basis of the difference image P3 and at least the overall transmission image. In this case, the use of the overall transmission image makes it possible to easily inspect, for example, whether a foreign material is present or absent in the articles G having various thicknesses.

In this embodiment, the inspection unit 23 may inspect the article G on the basis of the difference image P3 and at least the first transmission image P1. In this case, the use of the first transmission image P1 makes it possible for the inspection unit 23 to inspect, for example, whether a foreign material is present or absent particularly in a thin portion of the article G with high accuracy. In addition, for example, when the article G is wrapped in a sheet-like packaging material, the inspection unit 23 can also inspect the tearing of the packaging material, the defective sealing of the packaging material (seal bite), and the like with high accuracy.

In this embodiment, the inspection unit 23 may inspect the article G on the basis of the difference image P3 and at least the second transmission image P2. In this case, the use of the second transmission image P2 makes it possible to inspect, for example, whether a foreign material is present or absent in a relatively thick portion of the article G with high accuracy.

In this embodiment, the image generation unit 22 may generate the first transmission image P1 on the basis of the overall transmission image and the second transmission image P2.

In this embodiment, the X-ray inspection apparatus 1 includes the display operation unit 8 that receives an operation from the outside, and the display operation unit 8 receives an operation of selecting the image used by the inspection unit 23 to inspect the article G. Therefore, for example, the accuracy of inspection can be appropriately changed through the display operation unit 8.

The X-ray detection unit 7 may be a direct-conversion-type detection unit. In this case, it is possible to reduce the size of the X-ray inspection apparatus 1.

The embodiment of the present disclosure has been described above. However, the present disclosure is not necessarily limited to the above-described embodiment, and various modifications can be made without departing from the scope of the present disclosure.

In the above-described embodiment, the inspection unit inspects the article using at least the difference image. However, the present disclosure is not limited thereto. For example, the inspection unit may inspect the article using at least the overall transmission image. For example, the inspection unit may inspect the article on the basis of the overall transmission image and at least the first transmission image, may inspect the article on the basis of the overall transmission image and at least the second transmission image, or may inspect the article on the basis of the overall transmission image and at least the difference image. In this case, since the overall transmission image is certainly used, it is possible to inspect, for example, whether a foreign material is present or absent in the articles having various thicknesses with high accuracy. In addition, since the inspection unit inspects the article on the basis of each of the overall transmission image and the transmission images, it is possible to inspect, for example, whether a foreign material is present or absent in the article with high accuracy.

In the above-described embodiment, the X-ray inspection apparatus has the control unit that performs the image processing. However, the present disclosure is not limited thereto. For example, the function of performing the image processing, the function of determining whether or not a foreign material is included in the article on the basis of the difference image, the function of displaying the X-ray inspection results, and the like in the control unit may not be included in the X-ray inspection apparatus. Alternatively, the functions may be provided in a control device that can perform wired communication or wireless communication with the X-ray inspection apparatus. In this case, it is possible to implement an X-ray inspection system including the X-ray inspection apparatus and the control device to which the inspection results of the X-ray inspection apparatus are input. The same operation and effect as those of the above-described embodiment are also obtained by this X-ray inspection system. In addition, it is possible to simplify the configuration of the control unit provided in the X-ray inspection apparatus. Furthermore, the user can check, for example, the inspection results even at a place away from the X-ray inspection apparatus. Further, the control device is not particularly limited and may be, for example, a laptop PC, a tablet, or the like. In addition, the control device may not have the function of determining whether a foreign material is present or absent.

This application claims the priority benefit of Japanese Application No. JP2022-15119 filed on Feb. 2, 2022, the entire contents of which are incorporated herein by references.

What is claimed is:

1. An X-ray inspection apparatus comprising:
an X-ray source configured to irradiate an article with X-rays in a plurality of energy bands;
an X-ray detection unit capable of detecting the X-rays by a photon counting method;
an image generation unit configured to generate an overall transmission image corresponding to the X-rays in all of the plurality of energy bands and a transmission image corresponding to the X-rays in some of the plurality of energy bands on the basis of a detection result of the X-rays by the X-ray detection unit; and
an inspection unit configured to inspect the article on the basis of each of the overall transmission image and the transmission image.

2. The X-ray inspection apparatus according to claim 1, wherein the X-ray detection unit is a direct-conversion-type detection unit.

3. An X-ray inspection apparatus comprising:
an X-ray source configured to irradiate an article with X-rays in a plurality of energy bands;
an X-ray detection unit capable of detecting the X-rays using a photon counting method;
an image generation unit configured to generate (1) an overall transmission image corresponding to the X-rays in all of the plurality of energy bands, (2) a first transmission image corresponding to the X-rays in a first energy band included in the plurality of energy bands, (3) a second transmission image corresponding to the X-rays in a second energy band which is included in the plurality of energy bands and is lower than the first energy band, and (4) a difference image obtained by a subtraction process between the first transmission image and the second transmission image on the basis of a detection result of the X-rays by the X-ray detection unit; and
an inspection unit configured to inspect the article on the basis of each of the difference image and at least one of the overall transmission image, the first transmission image, and the second transmission image.

4. The X-ray inspection apparatus according to claim 3, wherein the inspection unit is configured to inspect the article on the basis of the difference image and at least the overall transmission image.

5. The X-ray inspection apparatus according to claim 3, wherein the inspection unit is configured to inspect the article on the basis of the difference image and at least the first transmission image.

6. The X-ray inspection apparatus according to claim 3, wherein the inspection unit is configured to inspect the article on the basis of the difference image and at least the second transmission image.

7. The X-ray inspection apparatus according to claim 3, wherein the image generation unit is configured to generate the first transmission image on the basis of the overall transmission image and the second transmission image.

8. The X-ray inspection apparatus according to claim 3, further comprising a display unit configured to receive an operation from an outside,
wherein the display unit is configured to receive an operation of selecting an image used to inspect the article by the inspection unit.

9. The X-ray inspection apparatus according to claim 3, wherein the X-ray detection unit is a direct-conversion-type detection unit.

* * * * *